No. 891,682. PATENTED JUNE 23, 1908.
G. FERRANDO.
SPRING WHEEL.
APPLICATION FILED FEB. 8, 1906.

Witnesses
Inventor
Giuseppe Ferrando
By
Mason, Fenwick & Lawrence
Attys

UNITED STATES PATENT OFFICE.

GIUSEPPE FERRANDO, OF GENOA, ITALY.

SPRING-WHEEL.

No. 891,682.  Specification of Letters Patent.  Patented June 23, 1908.

Application filed February 8, 1906. Serial No. 300,196.

*To all whom it may concern:*

Be it known that I, GIUSEPPE FERRANDO, a subject of the King of Italy, residing at Genoa, Italy, via Montallegro, Villa Vopallo, have invented certain new and useful Improvements in Spring-Wheels; and I do hereby declare the following to be a full, clear, and exact description of the invention, such as will enable others skilled in the art to which it appertains to make and use the same.

This invention relates to improvements in that type of vehicle wheels wherein metallic springs are employed to attain the resiliency usually obtained by the use of pneumatic tires.

The object of the invention is to provide a wheel of this character comprising few and simple parts which mutually coöperate with each other in a peculiar manner to obtain a strong and durable construction.

With these and other objects in view, the invention comprises certain other novel constructions, combinations and arrangements of parts, as will be hereinafter fully described and claimed.

Figure 1:
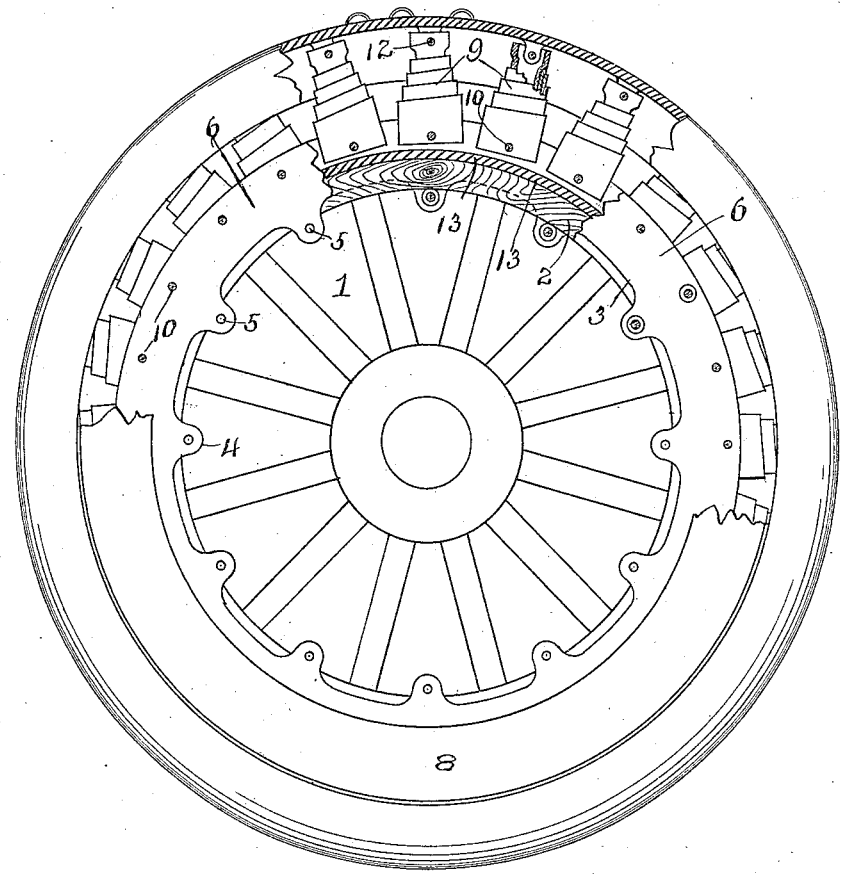
Figure 2:
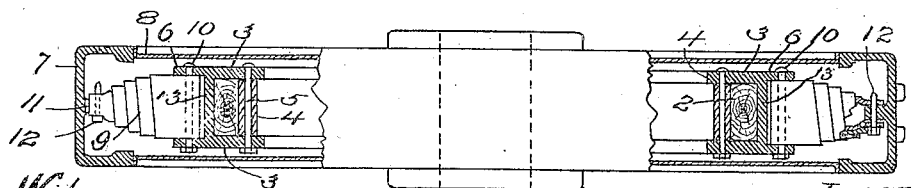

In the drawings:—Figure 1 is a front elevation of a wheel constructed in accordance with the invention, portions being broken away. Fig. 2 is a side elevation of the same, portions being broken away.

Broadly speaking the invention comprises a wheel formed with two concentric rims which are loosely connected by means of a series of radial springs. The numeral 1 designates a wheel which may be of any conventional construction and which is provided with a rim 2. A metallic band 13 surrounds the rim 2 and is formed along opposite edges with inwardly extending flanges 3 which embrace the rim 2 and hold the band 13 against lateral movement. These inwardly extending flanges 3 are provided at intervals with ears 4 which project inwardly beyond the rim 2 and are connected by bolts or similar fastening means 5. A pair of outwardly extending flanges 6 is also formed in connection with the band 13 and these flanges 6 are in alinement with the above-mentioned inwardly extending flanges 3. The outer rim 7 of the wheel is spaced from the rim 2 and preferably has a channel formation as indicated in the drawings, the side flanges of the channel portion being connected to guard members 8 which extend inwardly on opposite sides of the wheel and serve to exclude dust and other foreign matter from the springs 9, which connect the outer and inner rims of the wheel. These springs 9 are formed by coiling a strip of flat spring material and have their bases or larger ends pivotally connected between the outwardly extending flanges 6 upon the band 13 by means of transversely disposed pins 10 connecting the said flanges. Projecting inwardly from the outer rim 7 is a series of lugs 11 to which the outer ends of the springs 9 are pivotally connected by means of the pins 12. With this construction it will be apparent that the springs have a pivotal connection with both the outer and inner rims, which, in conjunction with their resilient nature enables the inner rim to be moved with respect to the outer rim.

What I claim is:—

1. In a spring wheel, the combination of an inner rim, a band surrounding the inner rim, and provided along opposite edges with inwardly extending flanges which embrace the inner rim, and also with outwardly extending flanges, a series of bolts connecting the oppositely disposed, outwardly extending flanges, an outer rim spaced from the inner rim, and a series of coil springs having their outer ends pivotally connected to the outer rim while their inner ends are pivotally connected to the above-mentioned bolts joining the outwardly extending flanges upon the above-mentioned band.

2. In a spring wheel, the combination of an inner rim, a band surrounding the inner rim, and provided along opposite edges with inwardly extending flanges which embrace the inner rim and are provided at intervals with ears which project inwardly beyond the inner rim and are connected by fastening means, the said band being also provided with a pair of oppositely disposed, outwardly projecting flanges, pins connecting the outwardly extending flanges, an outer rim spaced from the inner rim, and a series of coil springs having their outer ends pivotally connected to the outer rim while their inner rims are pivotally connected to the pins connecting the above-mentioned outwardly extending flanges upon the band.

3. In a spring wheel, the combination of an inner rim, a band encircling the inner rim and provided along its opposite edges with inwardly extending flanges which embrace the inner rim, and also with a pair of oppositely disposed, outwardly projecting flanges, a series of pins connecting the outwardly projecting flanges, an outer rim spaced from the inner rim and provided at intervals with inwardly projecting lugs, and a series of coil springs having their outer ends pivotally connected to the lugs upon the outer rim, while the inner ends are pivotally connected to the above-mentioned pins connecting the outwardly extending flanges upon the above-mentioned band.

Signed by me at Genoa, in the Kingdom of Italy this 17th day of January 1906.

GIUSEPPE FERRANDO.

Witnesses:
    ARTURO MOSCONI,
    CAMPANELLA LUIGI.